(12) United States Patent
Ito (10) Patent No.: US 11,163,939 B2
(45) Date of Patent: Nov. 2, 2021

(54) ARTICLE INSPECTION APPARATUS

(71) Applicant: ANRITSU INFIVIS CO., LTD., Kanagawa (JP)

(72) Inventor: Takamasa Ito, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 16/215,954

(22) Filed: Dec. 11, 2018

(65) Prior Publication Data

US 2019/0197090 A1    Jun. 27, 2019

(30) Foreign Application Priority Data

Dec. 21, 2017 (JP) .............................. JP2017-245463

(51) Int. Cl.
*G06F 40/166* (2020.01)
*G06F 3/0484* (2013.01)
*G06F 40/106* (2020.01)

(52) U.S. Cl.
CPC .......... *G06F 40/166* (2020.01); *G06F 3/0484* (2013.01); *G06F 40/106* (2020.01)

(58) Field of Classification Search
None
See application file for complete search history.

(56) References Cited

U.S. PATENT DOCUMENTS

| 7,113,628 B1 * | 9/2006 | Obara | G06T 7/001 356/237.1 |
|---|---|---|---|
| 10,521,903 B2 * | 12/2019 | Kang | G16H 20/60 |
| 2005/0276459 A1 * | 12/2005 | Eames | G06F 3/0485 382/141 |
| 2006/0209299 A1 * | 9/2006 | Vertoprakhov | G01N 21/8806 356/237.5 |
| 2007/0002929 A1 * | 1/2007 | Frankel | G01J 5/026 374/121 |
| 2007/0058037 A1 * | 3/2007 | Bergeron | G01N 23/04 348/82 |
| 2009/0048705 A1 * | 2/2009 | Nubling | G01B 11/04 700/228 |
| 2010/0121844 A1 * | 5/2010 | Slaney | G06F 16/58 707/723 |

(Continued)

FOREIGN PATENT DOCUMENTS

| JP | H06-300698 A | 10/1994 |
|---|---|---|
| JP | 2009-183818 A | 8/2009 |
| JP | 2011-206710 A | 10/2011 |

*Primary Examiner* — Howard Cortes
(74) *Attorney, Agent, or Firm* — Pearne & Gordon LLP (57) ABSTRACT

An article inspection apparatus includes an inspection control unit 31 and a weighing conveyor main unit 32 that inspect an article W while the article is being conveyed, and a display unit 50 and a display control unit 33 that output an image for displaying a determination result about a plurality of determination items as an image on the same screen in response to an inspection result. The display control unit 33 includes a selection unit 37 and an editing unit 38 that switches an image for displaying a determination result about a specific determination item out of a plurality of determination items to another image for displaying the determination result which is stored and held in advance, in response to a display change request input for the specific determination item.

5 Claims, 6 Drawing Sheets

(56) References Cited

U.S. PATENT DOCUMENTS

| | | | | |
|---|---|---|---|---|
| 2010/0179844 A1* | 7/2010 | LaFergola | ................ | G07C 5/08 |
| | | | | 701/31.4 |
| 2010/0217678 A1* | 8/2010 | Goncalves | ........... | G06Q 20/203 |
| | | | | 705/22 |
| 2012/0085686 A1* | 4/2012 | Radema | ................ | B07C 5/3412 |
| | | | | 209/552 |
| 2013/0177232 A1* | 7/2013 | Hirano | ................. | G06T 7/0004 |
| | | | | 382/141 |
| 2013/0239063 A1* | 9/2013 | Ubillos | ................ | G06K 9/4652 |
| | | | | 715/838 |
| 2014/0341476 A1* | 11/2014 | Lick | ....................... | G06F 16/51 |
| | | | | 382/224 |
| 2015/0212702 A1* | 7/2015 | Kim | ..................... | G06F 3/0482 |
| | | | | 715/838 |
| 2016/0078396 A1* | 3/2016 | Kamioka | ............... | G06Q 50/04 |
| | | | | 455/456.1 |
| 2016/0267429 A1* | 9/2016 | Kitaoka | ............... | G06Q 10/087 |
| 2017/0004616 A1* | 1/2017 | Okamoto | ......... | G06Q 10/06398 |
| 2017/0011329 A1* | 1/2017 | Tokuoka | ............... | G06F 3/0481 |
| 2017/0165891 A1* | 6/2017 | Shiraishi | ................ | B29C 45/76 |
| 2017/0177195 A1* | 6/2017 | Findlay | ................... | G06T 11/60 |
| 2018/0049356 A1* | 2/2018 | Mori | ............... | G05B 19/41875 |
| 2018/0314866 A1* | 11/2018 | Kotula | .................... | G06K 9/20 |
| 2019/0035066 A1* | 1/2019 | Bae | .................... | G01N 21/9515 |
| 2019/0050629 A1* | 2/2019 | Olgiati | ............... | G06K 9/00261 |
| 2019/0102656 A1* | 4/2019 | Kwant | ................... | G06K 9/623 |
| 2019/0197985 A1* | 6/2019 | Tanaka | .................. | G09G 5/026 |
| 2020/0232884 A1* | 7/2020 | Onekea | ............... | G01M 17/007 |

* cited by examiner

|   | Prod 001 | CHOCOLATE |       | 2017-10-27 13:14 |           | ? |
|---|---|---|---|---|---|---|

| | | | | |
|---|---|---|---|---|
| Total | 34 | | Lot No. | |
| 11t — OK | 33 | 97.1 % | St.Time | 2017-10-26 16:01:06 |
| 12t — +NG | 0 | 0.0 % | TOTAL.W | 1.65 kg |
| 13t — -NG | 1 | 2.9 % | X-bar | 48.5926 g |
| 14t — EXNG | 0 | 0.0 % | S | 8.5867 g |
| 15u — D-Prod. | 0 | 0.0 % | R | 50.30 g |
| Full count | | 0 pcs | Max | 50.30 g |
| | | | Min | 0.00 g |

50.00 g | ALL | Pass

| Menu | 1 2 3 4 5 Display | Ope.Check | Pro Cntl | Set / Adj |

ARTICLE INSPECTION APPARATUS

TECHNICAL FIELD

The present invention relates to an article inspection apparatus for inspecting an article to be conveyed, and more particularly to an article inspection apparatus suitable for inspection such as weighing or foreign object detection.

BACKGROUND ART

An article inspection apparatus which weighs an article while the article is being conveyed or detects a foreign object contaminated in the article is widely used in various production lines of food and others. In general, an inspection result is output as an image using figures such as texts and icons, and articles whose determination results are defective are sorted and discharged by a sorting device on the downstream side or the like.

As such an article inspection apparatus, in addition to an apparatus which weighs an article to be inspected by mass inspection, and sequentially displays on a screen a determination result as to whether or not the article is a non-defective article whose content amount falls within a predetermined range, or displays on a screen the production management information such as the variation width of the mass value, an apparatus which displays on such a display screen, a determination result of foreign object detection or the like performed on other upstream apparatus has been known (see, for example, Patent Document 1).

RELATED ART DOCUMENT

Patent Document

[Patent Document 1] JP-A-2009-183818

DISCLOSURE OF THE INVENTION

Problem that the Invention is to Solve

However, in the article inspection apparatus in the related art as described above, when a plurality of determination items included in the inspection result is displayed on a screen, a fixed display form is applied for each screen. Therefore, the display of each determination item is set to be easy to view and recognize for most of users (the operators of the apparatus), but for some users, the name of the determination item, the language, the size of letters or icons, or the like may not be sufficiently appropriate in some cases. Further, in such a case, there has been an unsolved problem that the user cannot change the appearance on display screen of the inspection result to a preferable form.

For example, in the case where the result of the article inspection performed on the apparatus at the front stage (upstream side) is displayed together with the result of inspection performed by the article inspection apparatus at the subsequent stage (downstream side), the result of determination performed by the upstream external inspection apparatus is displayed by using a general-purpose item name such as "EXNG". However, in that case, it is not possible to change the name of determination item on the display screen of the article inspection apparatus to a more specific name of inspection item or the like, depending on the installation condition of the apparatus, and it is also not possible to change the name of determination item corresponding to the change of the production line configuration or the like.

The present invention has been made to solve the above-described problems in the related art, and an object of the present invention is to provide an article inspection apparatus capable of changing a display form of identification information such as a determination item name to be displayed during inspection, in response to a request of a user.

Means for Solving the Problem

In order to achieve the above object, an article inspection apparatus according to the present invention includes inspection means for inspecting an article while the article is being conveyed; identification information output means for outputting identification information on a plurality of determination items, the identification information including an inspection result by the inspection means; a storage unit that stores a plurality of pieces of the identification information on each of the plurality of determination items; and an identification information changing unit that switches the identification information on a specific determination item out of the plurality of determination items to other pieces of identification information which is stored and held in the storage unit, in response to a display change request input for the specific determination item.

With this configuration, when a request to change display form is inputted (display change request input) about a specific determination item out of the plurality of determination items, identification information about the specific determination item is switched to other type of identification information which is stored and held in advance, by the identification information changing unit of the identification information output means, in response to the request. Therefore, the display form of the identification information such as the name of determination item to be displayed during the inspection can be changed in response to the request of the user.

In the article inspection apparatus of the present invention, the identification information changing unit may be configured to include an editing unit that creates new identification information as the alternative option, that is candidates, corresponding to the request to change display form, in response to the request for the specific determination item. In this case, the editing unit can easy create or modify a text string or an icon corresponding to a specific determination result.

Further, in the article inspection apparatus of the present invention, the specific determination item out of the plurality of determination items may be a display item corresponding to a determination result input from other apparatus. This makes it possible to create new identification information as the alternative option according to the request to change display form, and add identification information suitable for the user or extend a plurality of pieces of identification information with respect to a specific determination item.

Further, in the article inspection apparatus of the present invention, the identification information output means may be configured to include a display control unit that causes a display unit to display the identification information on the plurality of determination items. In this case, in performing a comprehensive determination or the like in consideration of the determination result from another apparatus, even when an apparatus that inspects another article is new or changed, display of a specific determination item corresponding to the determination result from another apparatus can be easily customized in response to the display change request input. For example, identification information can be changed easily when the upstream inspection apparatus is changed from checking packaging fault to detecting foreign metal object.

Advantage of the Invention

According to the present invention, it is possible to provide an article inspection apparatus capable of changing an identification information display form of a determination item name or the like to be displayed during inspection in response to a request of a user.

BEST MODE FOR CARRYING OUT THE INVENTION

Hereinafter, an embodiment of the present invention will be described with reference to the drawings.

FIGS. 1 to 7 show an example of a mass inspection system using an article inspection apparatus according to an embodiment of the present invention for mass inspection.

First, the configuration will be described.

Figure 1:
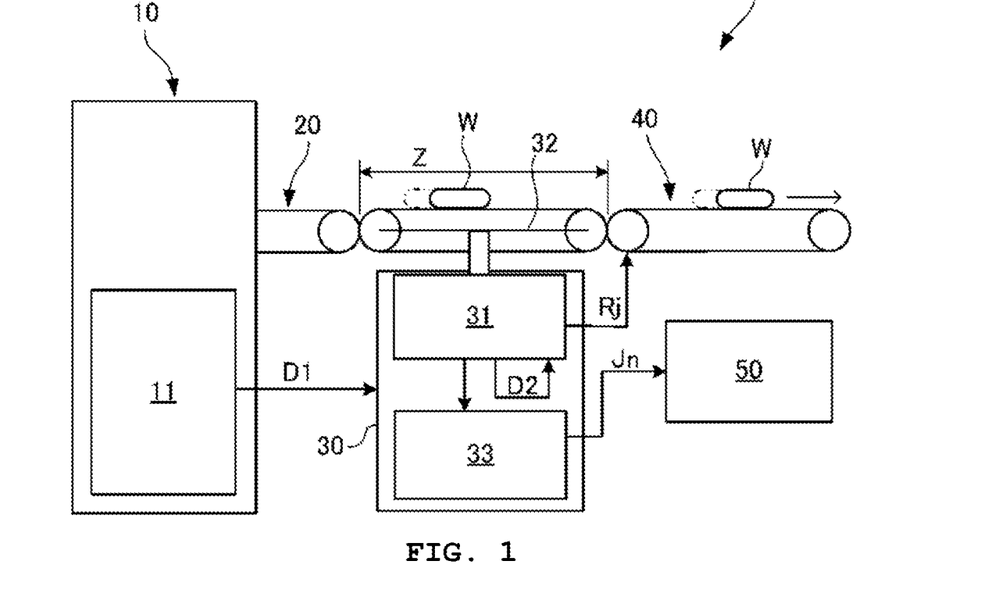
FIG. 1 is a schematic configuration diagram of a mass inspection system including an article inspection apparatus according to an embodiment of the present invention.
Figure 2:
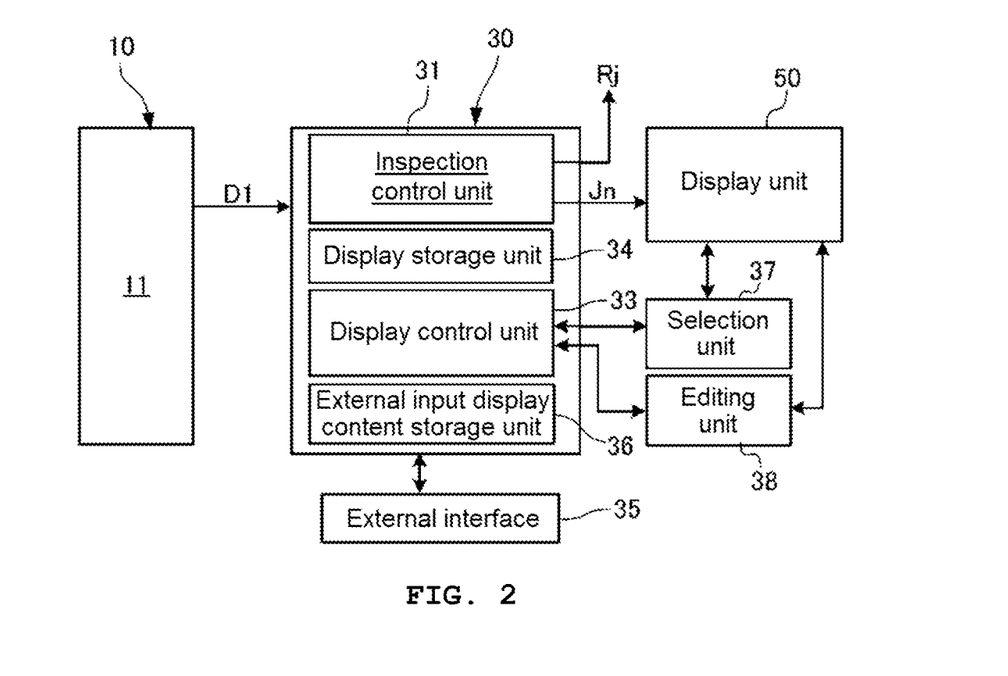
FIG. 2 is a schematic block configuration diagram of a control system in the mass inspection system including the article inspection apparatus according to the embodiment of the present invention.

As shown in FIGS. 1 and 2, a mass inspection system 1 of the present embodiment includes an apparatus 10 at the front stage (upstream side), an inspection machine 30 that executes a predetermined article inspection while conveying the article W in a predetermined direction when an inspected article is fed through a running conveyor 20 from the apparatus 10 at the front stage, a sorting conveyor 40 that conveys the inspected article W to the downstream side, and a display unit 50 of a touch panel type capable of receiving an input from the user and outputting a screen for the user.

The apparatus 10 at the front stage is, for example, a known filling and packaging machine, and sequentially feeds articles W, which are objects to be inspected after the filling and packing work, to the inspection machine 30 through the running conveyor 20. Each time the filling and packaging work for each article W is completed, the apparatus 10 at the front stage (upstream side) determines whether or not the filling and packaging work has been normally completed, and outputs an NG signal D1 (external NG signal) for the defective article W to the outside, for example, to the inspection machine 30 when it is determined that an abnormality occurs in the filling and packaging work.

Since the inspection machine 30 inspects the required quality, content amount, and the like of the articles W to be conveyed, the inspection machine 30 is a weighing conveyor, for example. The inspection machine 30 can measure the mass of the article W within a predetermined conveyance section Z in which the article W is conveyed in the right direction in FIG. 1.

Specifically, the inspection machine 30 includes an inspection control unit 31 including a load sensor such as a known load cell or electromagnetic balance, and a weighing conveyor main unit 32 capable of applying the weight of the article W as a load to the above-described load sensor in the inspection control unit 31 while conveying the article W, and creates a selection signal Rj for controlling the sorting conveyor 40 and a determination result signal Jn for performing display output to a display unit 50, based on the load signal from the inspection control unit 31. A display control unit 33 capable of switching and controlling a part of the display content on the display unit 50 in cooperation with the inspection control unit 31 is installed in the inspection machine 30.

The display control unit 33 together with the inspection control unit 31 and the display unit 50 constitute identification information output means. The display control unit 33 stores and holds the image for determination result display for the plurality of determination items on the display unit 50, for each type of the inspection result display screen. When a display request operation of a certain inspection result display screen is made by the touch panel operation input on the display unit 50, according to the inspection result by the inspection machine 30, the display control unit 33 outputs an image of a predetermined display item associated with the inspection result screen on the same inspection result display screen of the display unit 50.

Specifically, the inspection control unit 31 and the display control unit 33 of the inspection machine 30 each is configured to include, for example, a CPU, a ROM, a RAM, an input and output interface circuit, or the like (although the specific hardware configuration of each is not show), and controls the operations of the inspection machine 30 and the sorting conveyor 40, and can further control the contents displayed by the display unit 50, according to a plurality of control programs stored in the ROM or another memory device, for example, a mass measurement program and a display control program for displaying a screen according to the measurement result, or the like. That is, the inspection machine 30 includes a plurality of functional units as shown in FIG. 2 by a plurality of control programs built in the ROM or the like.

In addition to the inspection control unit 31 and the display control unit 33, the inspection machine 30 is provided with a display storage unit 34 that stores and holds in advance a plurality of display screens that can be displayed on the display unit 50 and images of a plurality of display elements in each display screen, and an external input display content storage unit 36 capable of inputting and outputting a display image corresponding to a specific display screen, for example, an image (identification information) for displaying a plurality of determination items on the inspection result display screen through the external interface 35. The image for displaying determination items input to the external input display content storage unit 36 indicates, for example, an abnormality in the filling and packaging operation and abnormality in the conveyance state in the apparatus 10 at the front stage.

The term "determination item" referred to here indicates an item for which information obtained by performing a necessary process such as counting on a determination result such as pass or fail determination of article inspection performed by the apparatus 10 at the front stage or the inspection machine 30 is output as a screen display or print. The identification information for identifying and displaying the determination item is a name or a figure for each item for displaying the determination item in a form identifiable to the user. Therefore, the term "identification information" referred to here can be used as information for identifying and displaying the item in a case where the determination contents (such as OK, NG) including the inspection result by the device such as the inspection machine 30 are counted for each determination item. Alternatively, the identification information can be used to identify and display items related to defective determination specific to a production line other than the inspection result by the inspection machine 30 or the like. The display form of the identification information may include a display output or a print output of the determination result, and may have an output form of any image (a text image or other any images) for notifying the user of the determination result.

The display control unit 33 also has a function of switching an image for determination result display for the specific determination item stored in the display storage unit 34 and the external input display content storage unit 36, among a plurality of determination items in a specific display screen displayed on the display unit 50 to another image for determination result display, in response to an input of display change request made by a touch panel operation input on the display unit 50.

The input from the apparatus 10 at the front stage is input to the inspection machine 30, and the external interface 35 is used for inputting images and text strings as described above. The external interface 35 conforms to a plurality of data communication standards such as USB, Bluetooth (registered trademark), file transfer protocol (FTP), and infrared communication.

More specifically, as shown in FIGS. 3 to 7, the display control unit 33 is also provided with a selection unit 37 (an image changing unit) that operates in response to a display change request input from the display unit 50 and selectively switches the image for determination result display related to the above-described specific determination item. In the display example 61 shown in FIG. 3, the inspection result (mass (g) in FIG. 3) of each article under production together with the determination result ("EXNG", "upstream NG filling machine" in FIG. 3) of a different determination item are displayed. In the display example 62 shown in FIG. 4, the inspection results (OK, NG, or the like) of a plurality of articles under production are counted for each inspection item, and the counter values corresponding to the plurality of determination items are displayed as a list.

Figure 3:
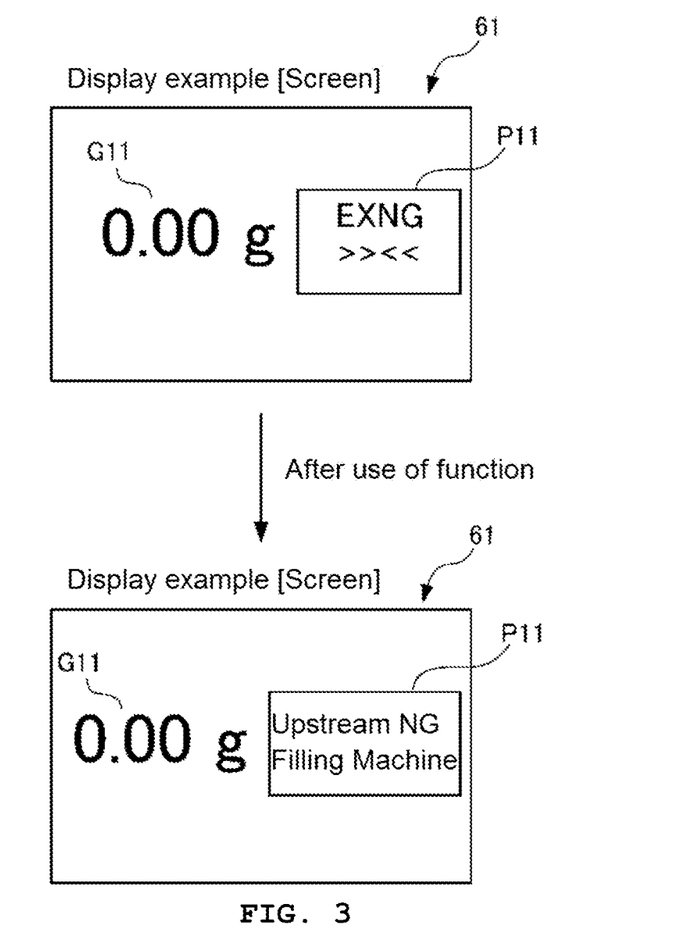
FIG. 3 is a diagram explaining a process of changing display of a determination item in display of an inspection result of each article under production in the article inspection apparatus according to the embodiment of the present invention.

The selection unit 37 is capable of switching, for example, main inspection item of each article under production in the display example 61 shown in FIG. 3, for example, the result display G11 of mass inspection, and display element "EXNG" (display of one determination item) which is an image P11 for determination result display related to another specific determination item to another image corresponding to the display change request input, among a plurality types of display candidate images which are stored and held in advance in the display storage unit 34 and the external input display content storage unit 36, for example, a display element "upstream NG filling machine" shown in FIG. 3.

Figure 4:
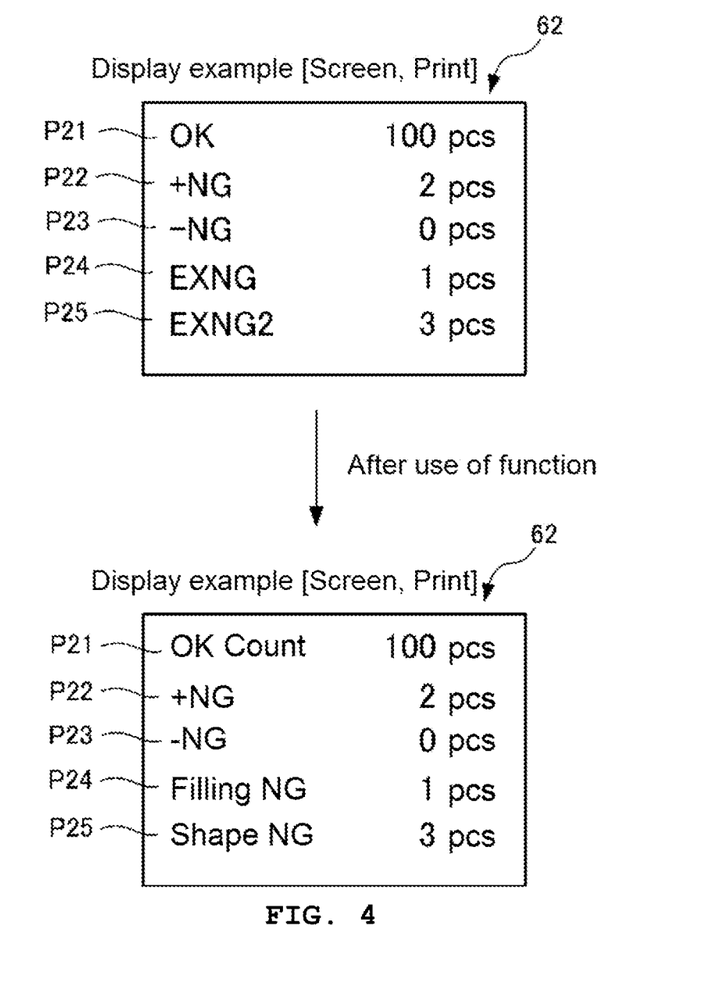
FIG. 4 is a diagram explaining a process of changing display of determination items in display of inspection results of a plurality of articles under production in the article inspection apparatus according to the embodiment of the present invention.

Alternatively, the selection unit 37 is capable of switching, for example, display elements "OK", "EXNG" and "EXNG2"(displays of a plurality of determination items) in FIG. 4 which are images for determination result display of specific determination items, among a plurality of determination items P21, P22, P23, P24, and P25 in the display example 62 shown in FIG. 4 to other images corresponding to the display change request input, among a plurality types of display candidate images which are stored and held in advance in the display storage unit 34 and the external input display content storage unit 36, for example, display elements "OK count", "Filling NG" and "shape NG" shown in FIG. 4.

That is, the selection unit 37 is capable of switchably selecting display elements (icons, text strings, or the like) about main determination items in the display screen (determination item identification information to be output) such as the display examples 61, 62, among the display contents stored in the display storage unit 34 and the external input display content storage unit 36.

The selection unit 37 stores and holds a plurality of types of display candidate images in association with the determination items displayed on the display examples 61, 62 or the inspection result display screens 63, 64 to be described later, in the display storage unit 34 and the external input display content storage unit 36 such that the display candidate images are displayed, for example, together with the numbers ("11" to "15" in FIG. 5) of the determination items in FIG. 5. When a display change request input for a specific determination item (for example, an item of any one of the numbers "11" to "15" in FIG. 5) is made by the touch panel operation on the display unit 50, the selection unit 37 can display a plurality of types of display candidate images corresponding to the determination item (for example, text string images "EXNG", "Filling NG" and "Contam NG" and an icon image "EXNG" (with a device image) corresponding to the number "14" in FIG. 5) as candidate images in a predetermined order or in a list format, and when any display candidate image is designated by the touch panel operation on the display unit 50, the selection unit 37 can execute an image change process of switching the display candidate images up to the present to the designated next display candidate image.

A general-purpose expression is used for icons and text strings displayed in the determination items on the inspection result display screen of the inspection machine 30. In addition, the display example and the inspection result display screen referred to here may not only the inspection result display screen of each article W but also may be a display screen created on a unit basis such as a predetermined quantity of a plurality of articles W of the same type (product type), a lot, and a production period, or may include another any display screen for displaying the inspection result together with a plurality of determination item displays.

As shown in FIG. 2, the display control unit 33 is further provided with an editing unit 38 (image changing unit) that operates in response to the display change request input from the display unit 50 and executes an image creation support process capable of creating new display candidate images corresponding to the display change request input with respect to the above-described plurality of determination items P21 to P25.

Figure 5:
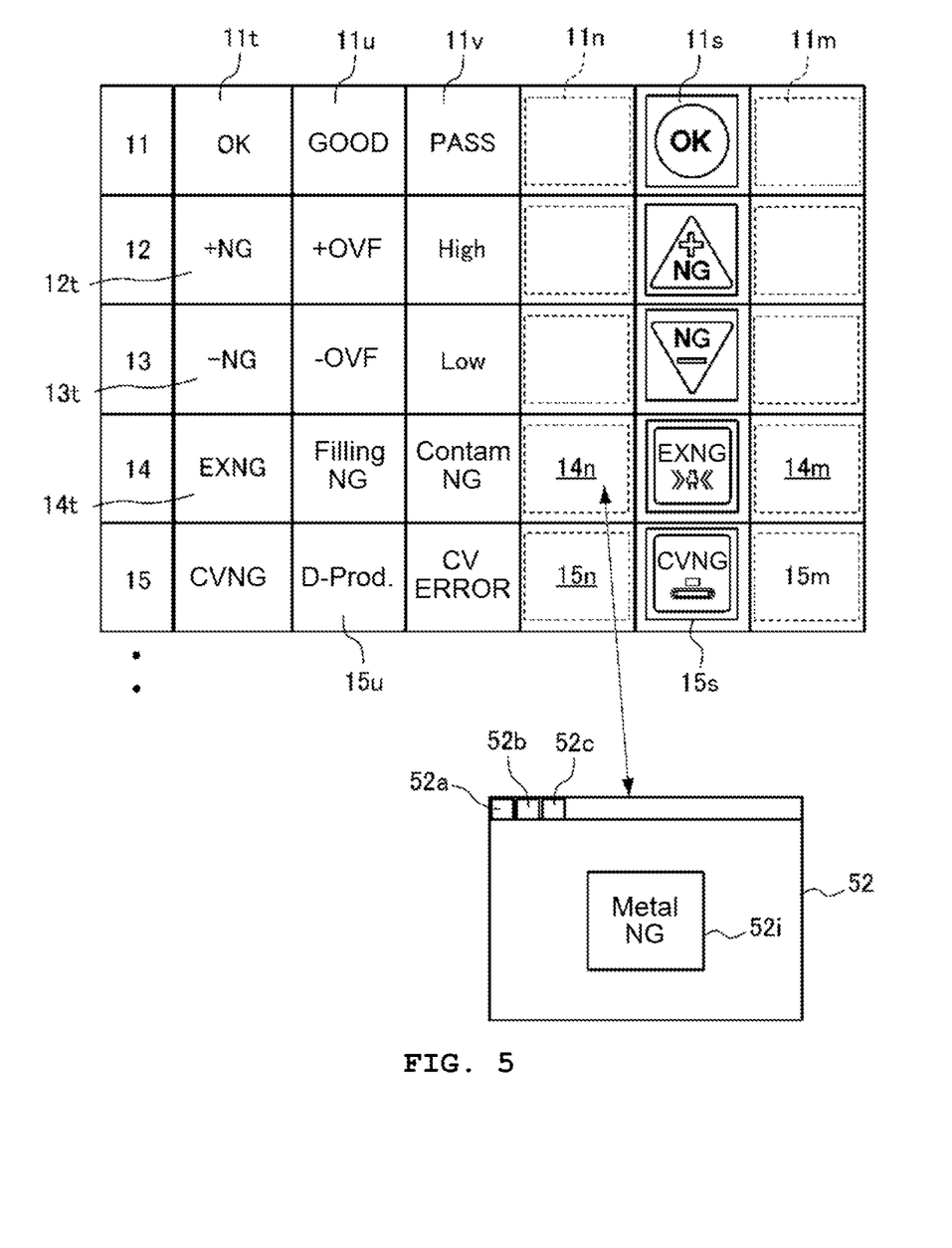
FIG. 5 is a diagram explaining a selection unit capable of selectively switching an image of a plurality of determination item displays displayed on an inspection result display screen in the article inspection apparatus according to the embodiment of the present invention.

In a state where a plurality of types of display candidate images corresponding to the specific determination items in the selection unit 37 are displayed, when the selection unit 37 selects an image of one of specific determination items, for example, any one of newly created image columns "14*n*" and "15*n*" on the text string side or newly created image columns "14*m*" and "15*m*" on the icon side, corresponding to numbers "14" and "15" in FIG. 5, in response to the touch panel operation on the display unit 50, or selects again any one of the text string images for change, the editing unit 38 activates a new image creation window 52 having a drawing function and an editor function, assuming that a display change request input for that icon has been made. In a case where there is an image to be changed, the editing unit 38 displays the image 52*i*, and executes an image creation support process capable of creating a new display candidate image (for example, a text string of "foreign metal", FIG. 5) corresponding to the display change request input, by using a plurality of drawing tools 52*a*, 52*b*, or the like or a text input tool 52*c*, or the like. In addition, any one of the specific determination items referred to here may be a plurality of images including text strings "11*t*" to "11*v*", newly created image columns "11*n*", "11*m*", an icon image "11*s*", or the like, corresponding to the internal determination result, for example, corresponding to the number "11" in FIG. 5.

In other words, the editing unit 38 has a function of adding a new display candidate image or modifying or changing the contents of the created display candidate image, for a specific display item, among the display items stored in the display storage unit 34 and the external input display content storage unit 36.

In addition, a program itself which exhibits such a drawing function in the editing unit 38 may be, for example, a program mounted as a painting function in the control operating system (OS), or an editor for instructing to change the display size, font, language, or the like of a text string or an icon.

Here, the specific determination item out of a plurality of determination items is described as "EXNG" (an abnormality determination input from an external device) which is a display item corresponding to the determination result input from the apparatus 10 at the front stage, but the specific determination item among a plurality of determination items may be one item out of the plurality of determination items or a plurality of items. The determination result input from an external device may be the normal determination input, instead of the abnormality determination input. Of course, the image of the specific determination item is not the determination result input from the external device but the image corresponding to the internal determination result signal D2 in the inspection machine 30 (for example, the text string images 11*t*, 11*u*, and 11*v* (text strings "OK", "GOOD", "PASS") corresponding to the number "11" in FIG. 5, the icon image 11*s* ("OK" with round button image), or the like.

As described above, in the present embodiment, the display images of a plurality of determination items included in the inspection result display screen can be changed to display images (texts, icons, or the like) suitable for the user for each determination display item.

Next, the operation will be described.

In the article inspection apparatus of the present embodiment configured as described above, general-purpose expressions are used for text strings, icons, and the like displayed for the determination of the inspection machine 30, expressions that are difficult for the user to understand can exist, which vary depending on the user and the use environment.

For the determination items in the inspection machine 30 of the present embodiment, expressions which can be used in general, "OK", "+NG", and "−NG" determined inside the inspection machine 30, "External NG", "External NG2" or the like which displays input from the outside of the inspection machine 30 are used. Therefore, the icons and text strings can be changed as described above, making it easy for the user of the inspection machine 30 to understand. Further, it is possible to set plural types of languages for text strings.

More specifically, it is assumed that, for example, filling defective or conveyance abnormality has occurred in the apparatus 10 at the front stage. In this case, an NG signal D1 (see FIG. 1), which is a filling error detection signal, is transmitted from the apparatus 10 at the front stage to the display control unit 33 of the inspection machine 30.

At this time, in response to the NG signal D1, the display control unit 33 creates either a text string or an icon corresponding the above-described determination item "14" as the display image of the determination item indicating the determination state of the operation error of the apparatus 10 at the front stage and executes display control so as to display the created text string or icon as display examples 61 and 62 on the display unit 50.

When a plurality of determinations indicating the inspection result of the article W are made inside the inspection control unit 31 of the inspection machine 30, the internal determination result signal D2 is transmitted from the inspection control unit 31 to the display control unit 33, and in response to the internal determination result signal D2, the display control unit 33 creates either a text string or an icon corresponding at least the above-described determination items "11" to "13" and executes display control so as to display the created text string or icon(which may be a combination) in the display examples 61 and 62 or the inspection result display screens 63 and 64 based thereon, on the display unit 50.

In the present embodiment, as described above, the display control unit 33 that has received the determination result from the inspection control unit 31 displays respective corresponding icons or text strings with respect to a plurality of determination items in the display examples 61, 62, the inspection result display screens 63, 64, and the like, but can change the display on the display unit 50 or the output of the display image to the outside to any text string, icon, or the like, in any of the following procedures S1 to S3. The term "external" referred to here is various other apparatuses or devices capable of data communication, and other nodes on the communication network. The output of the display image here includes not only the output of the image file or the text string data including the determination item identification information but also the existing print output to a recording sheet.

Figure 6:
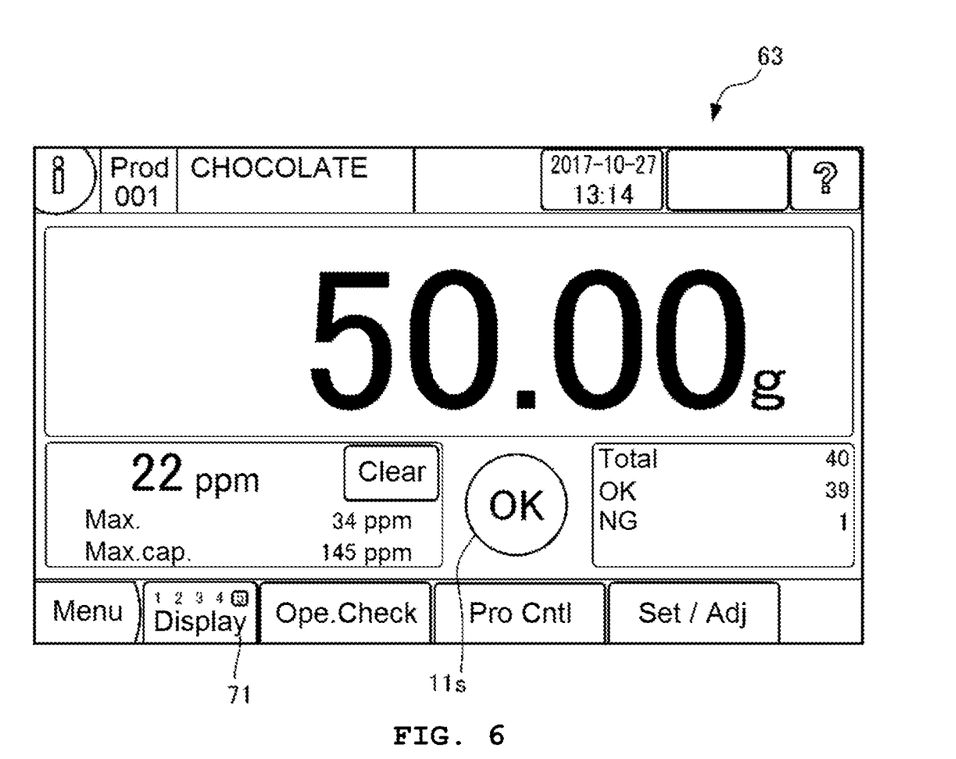
FIG. 6 is a diagram explaining an example of a more specific inspection result display screen including an inspection result of each article and a plurality of determination item displays in the article inspection apparatus according to the embodiment of the present invention.

S1) Normally, on the inspection result display screen 63 of each article W as shown in FIG. 6, a display change request operation button 71 or the like for designating either a display screen or a determination item is operated by a touch panel operation on the display unit 50, a display change request input is made for the icon and the text string equipped in the inspection machine 30, and for example, any one of the icon 11*s* and the text strings 11*t*, 11*u*, and 11*v* according to the display change request input is selected by the selection unit 37.

S2) In a case where the display change request input is to request creation of a new image, by the editing unit 38, the image creation support process using the above-described new image creation window 52 is performed, an image such as an icon corresponding to a drawing input operation of the user is created, or a text string according to the display change request input is created by the editor function of the editing unit 38.

Figure 7:
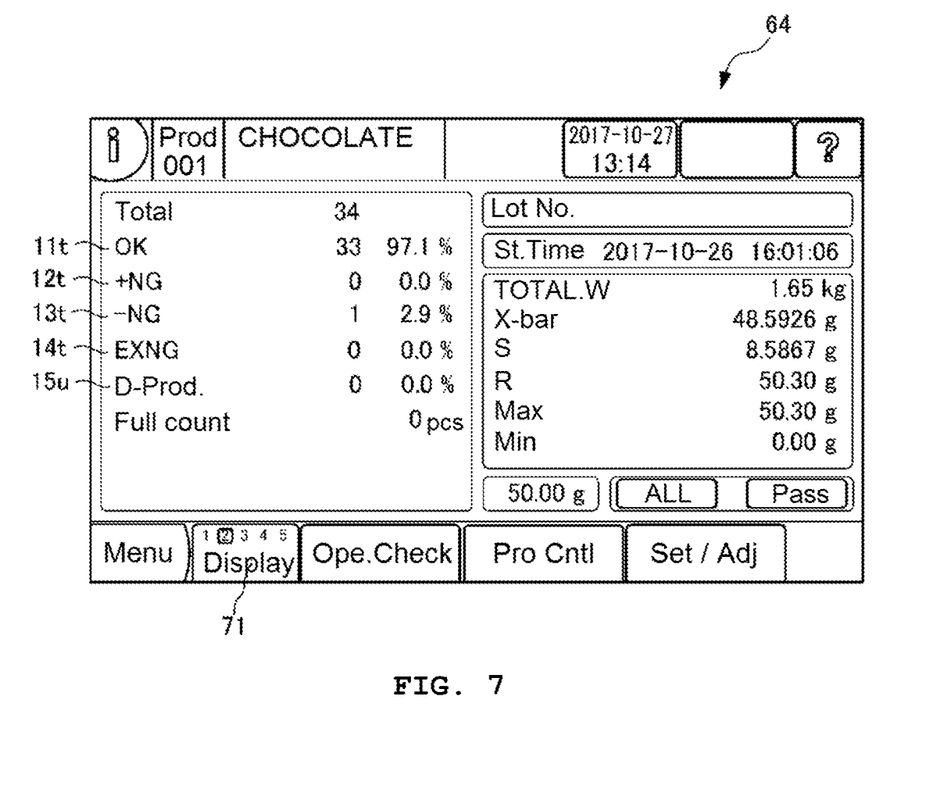
FIG. 7 is a diagram explaining another example of a more specific inspection result display screen including inspection results of a plurality of articles and a plurality of determination item displays in the article inspection apparatus according to the embodiment of the present invention.

S3) Further, in a case where icons or text strings are read from the outside, new icons and text strings (for example, "OK", "+NG", "-NG", "EXNG", "D-prod." in FIG. 5) are input as text strings 11t, 12t, 13t, 14t, 15u, or the like of the display image corresponding to the specific display screen, for example, the image for displaying some determination items on the inspection result display screen 64 shown in FIG. 7, through the external interface 35, in the form of device connection or data communication input in advance, and are stored and held in the external input display content storage unit 36.

As described above, the display control unit 33 controls the display content on the display unit 50 according to the inspection result of the inspection control unit 31, and switchably controls the specific display content, for example, the display element of the specific determination result on the inspection result display screen, in response to the display change request input from the user.

That is, if there is a display change request input from the user regarding a specific determination item among a plurality of determination items (for example, the item numbers "11" to "15", or the like), the image for displaying the determination result about the specific determination item is switched to another image for displaying the determination result which is stored and held in advance in the display storage unit 34 and the external input display content storage unit 36, by the selection unit 37 and the editing unit 38 of the display control unit 33, in response to the display change request input. Therefore, it is possible to easily and accurately change the display form of the determination item name or the like on the inspection result display screens 63, 64 of the inspection machine 30 to a display form which makes it easy to understand and difficult to overlook the occurrence of the abnormality in response to the user's request.

Further, in the present embodiment, in response to the display change request input, the selection unit 37 selects any one of the plurality of types of display candidate images as another image for displaying the determination result. Therefore, the image for determination result display for a specific determination item can be accurately, quickly and easily switched to another image corresponding to a display change request input.

Furthermore, in the present embodiment, the editing unit 38 can create a new display candidate image according to the display change request input, and add a display candidate image suitable for the user with respect to a specific determination item or add a plurality of display candidate images.

In addition, in the present embodiment, an external NG signal D1 indicating an abnormality in filling and packaging operation from the apparatus 10 at the front stage is input to the inspection machine 30, and a specific determination item (for example, "14" out of the numbers "11" to "15" in FIG. 5) out of the plurality of determination items displayed on the display unit 50 includes a display item "EXNG" corresponding to the determination result input from the apparatus 10 at the front stage (another device). Therefore, in the case of performing comprehensive determination or the like in consideration of the preceding external inspection result, even when another device such as the apparatus 10 at the front stage is new or changed, the inspection machine 30 can easily customize the display of the specific determination item corresponding to the determination result from another device in response to the display change request input.

Further, in a case where the identification information is an identification display of a defective determination item specific to a production line other than the inspection result (for example, see FIG. 3), by switching an item that needs to be displayed to a determination item, among a plurality of defective determination items, it is possible to output the number of the defect determination items in an output form that can be recognized easily. In the case where the identification information identifies and indicates items for counting, for each determination item, determination contents (OK, NG, and the like) including the inspection result by the apparatus such as the inspection machine 30 (for example, see FIG. 4), the user can easily recognize the number (NG number) of determination items concerning defects.

As described above, according to the present embodiment, it is possible to provide an article inspection apparatus capable of changing a display form of a determination item name or the like in the display examples 61, 62 and the inspection result display screens 63, 64 in response to a request of a user.

In the above-described embodiment, the article inspection apparatus is used for the mass inspection system 1 used for mass inspection, but if the display of the inspection result includes a plurality of determination item displays, the present invention is applicable not only to mass inspection but also to a metal detection apparatus, an X-ray foreign object detection apparatus, a deficient article inspection apparatus, and other article inspection apparatuses.

Further, in the above-described embodiment, the new image creation process is executed on one image selected from among the plurality of display candidate images in the selection unit 37, but it is also conceivable that the plurality of display candidate images in the selection unit is not displayed and the editing unit 38 changes the images of the text string or the icon being used with respect to one item selected on the display screen among the determination items being used to another display size, typeface, language or figure.

As described above, the present invention can provide an article inspection apparatus capable of changing the display form of the identification information of the determination item for displaying the inspection result in response to the request of the user, and the present invention is useful for all article inspection apparatuses suitable for inspection such as weighing or foreign object detection.

DESCRIPTION OF REFERENCE NUMERALS AND SIGNS

1 MASS INSPECTION SYSTEM
10 APPARATUS AT FRONT STAGE
11t, 11u, 11v, 11s, 12t, 13t, 14t, 15u PLURALITY OF DISPLAY CANDIDATE IMAGES
11n, 11m, 14n, 14m, 15n, 15m NEWLY CREATED IMAGE COLUMN
20 RUNNING CONVEYOR
30 INSPECTION MACHINE (ARTICLE INSPECTION APPARATUS)
31 INSPECTION CONTROL UNIT
32 WEIGHING CONVEYOR MAIN UNIT
33 DISPLAY CONTROL UNIT (IDENTIFICATION INFORMATION OUTPUT MEANS)
34 DISPLAY STORAGE UNIT
35 EXTERNAL INTERFACE

36 EXTERNAL INPUT DISPLAY CONTENT STORAGE UNIT
37 SELECTION UNIT
38 EDITING UNIT
40 SORTING CONVEYOR
50 DISPLAY UNIT (IDENTIFICATION INFORMATION OUTPUT MEANS)
52 NEW IMAGE CREATION WINDOW
52a, 52b DRAWING TOOL
52c TEXT INPUT TOOL
52i IMAGE
61, 62 DISPLAY EXAMPLE (DISPLAY OF INSPECTION RESULTS OF ARTICLES UNDER PRODUCTION)
63, 64 INSPECTION RESULT DISPLAY SCREEN
71 DISPLAY CHANGE REQUEST OPERATION BUTTON
D1 NG SIGNAL (EXTERNAL NG SIGNAL)
D2 INTERNAL DETERMINATION RESULT SIGNAL
Jn DETERMINATION RESULT SIGNAL
Rj SELECTION SIGNAL
W ARTICLE (ARTICLE TO BE INSPECTED)

What is claimed is:

1. An article inspection apparatus comprising:
    an inspection sensor configured to inspect articles while the articles are being conveyed;
    a storage unit that stores a plurality of representations of inspection result categories, each representation comprising information about whether at least one inspected article satisfies at least one inspection criterion value,
    a display configured to output an inspection report comprising:
        a first representation comprising a set of icon images for indicating the inspection result categories, each icon image indicating a respective inspection result category,
        a second representation comprising a set of representative words for indicating the inspection result categories, each representative word indicating a respective inspection result category, and
        a third representation comprising a set of abbreviations for indicating the inspection result categories, each abbreviation indicating a respective inspection result category; and
    a controller configured to cause the display to switch between the first, second, and third representations in response to a switch request input.

2. The article inspection apparatus according to claim 1, wherein the controller is further configured to provide an editor that creates a new set of representations of inspection result categories satisfying one of the at least one inspection criterion values, being below the one inspection criterion value, and exceeding the one inspection criterion value.

3. The article inspection apparatus according to claim 1, wherein the inspection report further contains a plurality of representations of inspection criteria values and a plurality of numbers of articles that satisfy each of the at least one inspection criteria values.

4. The article inspection apparatus according to claim 1, wherein the at least one inspection criterion value is a reference weight of an article.

5. The article inspection apparatus according to claim 1, wherein:
    the first representation comprises a number of articles that satisfy a first inspection criterion value,
    the second representation comprises a number of articles that satisfy a second inspection criterion value,
    the third representation comprises a number of articles that satisfy a third inspection criterion value.

* * * * *